United States Patent
Ito

(10) Patent No.: US 9,738,175 B2
(45) Date of Patent: Aug. 22, 2017

(54) DRIVE DEVICE, TRANSPORT APPARATUS, AND ENERGY STORAGE CONTROL METHOD

(71) Applicant: HONDA MOTOR CO., LTD., Tokyo (JP)

(72) Inventor: Yoshihiro Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/231,790

(22) Filed: Aug. 9, 2016

(65) Prior Publication Data

US 2017/0050532 A1    Feb. 23, 2017

(30) Foreign Application Priority Data

Aug. 19, 2015    (JP) .................. 2015-162169

(51) Int. Cl.
*H02P 1/00*    (2006.01)
*B60L 11/18*    (2006.01)

(52) U.S. Cl.
CPC ....... *B60L 11/1868* (2013.01); *B60L 11/1803* (2013.01)

(58) Field of Classification Search
CPC .. H02P 27/06; H02P 2201/09; H02P 2201/07; H02P 2201/11; H02P 27/08; H02P 3/14; H02P 5/00; H02P 9/04; H02P 9/06; H02P 9/48; H02P 31/00; H02P 5/747
USPC .... 318/139, 400.9, 400.11; 307/10.1, 77, 82
See application file for complete search history.

(56) References Cited

U.S. PATENT DOCUMENTS

| | | | | |
|---|---|---|---|---|
| 6,611,127 B2* | 8/2003 | Arimitsu | ................. | B60L 11/12 318/139 |
| 7,932,633 B2* | 4/2011 | King | ..................... | B60L 11/123 180/165 |
| 8,080,973 B2* | 12/2011 | King | ................... | B60L 11/1803 320/104 |
| 8,421,271 B2* | 4/2013 | King | ................... | B60L 11/1811 307/82 |
| 8,653,696 B2* | 2/2014 | King | ..................... | B60L 11/123 307/82 |
| 9,024,573 B2* | 5/2015 | King | ................... | B60L 11/1803 320/107 |
| 9,227,523 B2* | 1/2016 | King | ................... | B60L 11/1803 |
| 9,290,097 B2* | 3/2016 | Steigerwald | .......... | B60L 3/0069 |

(Continued)

FOREIGN PATENT DOCUMENTS

JP    2015-061369    3/2015

*Primary Examiner* — Paul Ip
(74) *Attorney, Agent, or Firm* — Mori & Ward, LLP

(57) ABSTRACT

A second energy storage is superior to a first energy storage in energy to weight density and inferior to the first energy storage in power to weight density. A booster is to boost a first voltage output from the first energy storage. A motor is to be driven by power output from at least one of the first energy storage and the second energy storage. A controller is to control the booster to operate in a first mode while a voltage point is within a referenced closed region and to operate in a second mode while the voltage point is outside the referenced closed region. The voltage point represents a relationship between the first voltage and a second voltage output from the second energy storage in a two-dimensional coordinate system having a first axis representing the first voltage and having a second axis representing the second voltage.

15 Claims, 7 Drawing Sheets

(56) References Cited

U.S. PATENT DOCUMENTS

| | | | |
|---|---|---|---|
| 9,321,367 B2 * | 4/2016 | King | B60L 11/1803 |
| 9,566,916 B2 * | 2/2017 | Rao | B60R 16/02 |
| 2002/0017892 A1 * | 2/2002 | Arimitsu | B60L 11/12 |
| | | | 318/801 |
| 2010/0096926 A1 * | 4/2010 | King | B60L 11/123 |
| | | | 307/45 |
| 2010/0097031 A1 * | 4/2010 | King | B60L 11/1803 |
| | | | 320/109 |
| 2011/0050174 A1 * | 3/2011 | King | B60L 11/1811 |
| | | | 320/134 |
| 2011/0169449 A1 * | 7/2011 | King | B60L 11/123 |
| | | | 320/109 |
| 2012/0038214 A1 * | 2/2012 | King | B60L 11/005 |
| | | | 307/77 |
| 2012/0074774 A1 * | 3/2012 | King | B60L 11/1803 |
| | | | 307/10.1 |
| 2012/0112702 A1 * | 5/2012 | Steigerwald | B60L 3/0069 |
| | | | 320/137 |
| 2012/0153878 A1 * | 6/2012 | King | B60L 11/1803 |
| | | | 318/139 |
| 2012/0153879 A1 * | 6/2012 | King | B60L 11/1803 |
| | | | 318/139 |
| 2014/0145677 A1 * | 5/2014 | King | B60L 11/123 |
| | | | 320/109 |
| 2015/0115709 A1 * | 4/2015 | King | B60L 11/1803 |
| | | | 307/10.1 |

\* cited by examiner

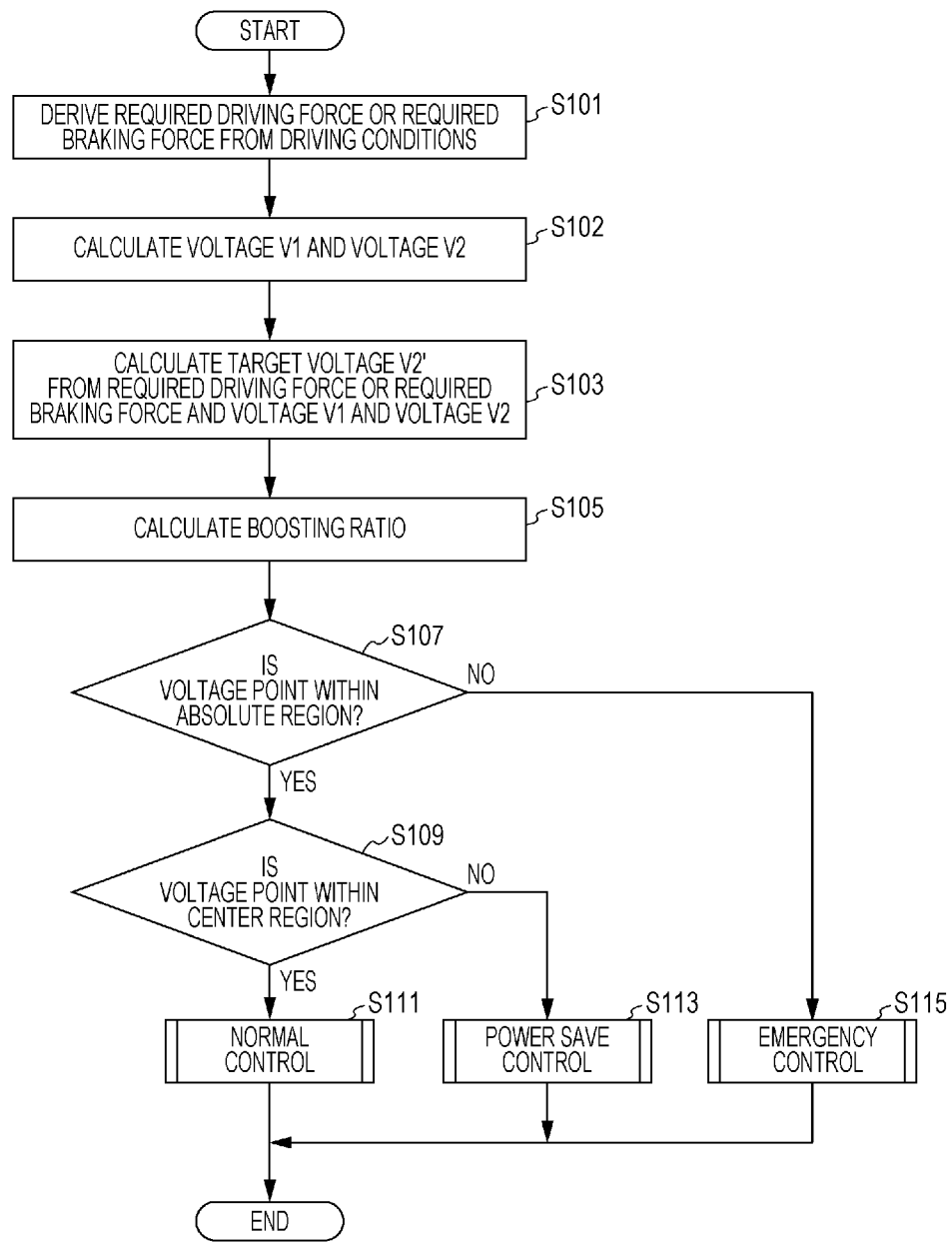

DRIVE DEVICE, TRANSPORT APPARATUS, AND ENERGY STORAGE CONTROL METHOD

CROSS-REFERENCE TO RELATED APPLICATIONS

The present application claims priority under 35 U.S.C. §119 to Japanese Patent Application No. 2015-162169, filed Aug. 19, 2015, entitled "Drive Device, Transport Apparatus, and Energy Storage Control Method." The contents of this application are incorporated herein by reference in their entirety.

BACKGROUND

1. Field

The present disclosure relates to a drive device, a transport apparatus, and an energy storage control method.

2. Description of the Related Art

An electric vehicle described in Japanese Unexamined Patent Application Publication No. 2015-061369 is a so-called electric car running only on electric energy (and not using an internal combustion engine therewith). The electric vehicle includes an electric motor configured to drive wheels, first and second batteries configured to supply power to the electric motor, and a power control unit configured to control the supply of power from each battery to the electric motor.

A battery selecting method is described in Japanese Unexamined Patent Application Publication No. 2015-061369. This method first determines required motor power and required battery energy capacity. Next, on a two-dimensional battery performance map using a battery power density and a battery energy density as parameters, a straight line having a constant slope corresponding to the ratio between the required motor power and the required battery energy capacity is set as a required P/E line. Then, a first battery selected from power batteries with power densities higher than the required P/E line and a second battery selected from energy batteries with energy densities higher than the required P/E line are combined in parallel and mounted on the vehicle.

SUMMARY

According to one aspect of the present invention, a drive device includes a first energy storage, a second energy storage, a booster, a motor, a controller. The second energy storage is superior to the first energy storage in energy to weight density and inferior to the first energy storage in power to weight density. The booster is to boost a first voltage output from the first energy storage. The motor is to be driven by power output from at least one of the first energy storage and the second energy storage. The controller is to control the booster to operate in a first mode while a voltage point is within a referenced closed region and to operate in a second mode while the voltage point is outside the referenced closed region. The voltage point represents a relationship between the first voltage and a second voltage output from the second energy storage in a two-dimensional coordinate system having a first axis representing the first voltage and having a second axis representing the second voltage. The first axis is perpendicular to the second axis.

According to another aspect of the present invention, in an energy storage control method for a drive device, a first voltage output from a first energy storage is detected. A second voltage output from a second energy storage is detected. The second energy storage is superior to the first energy storage in energy to weight density and inferior to the first energy storage in power to weight density. At least one of the first voltage and the second voltage is output to a motor. Whether a voltage point is within a referenced closed region in a two-dimensional coordinate system is determined. The two-dimensional coordinate system has a first axis representing the first voltage and a second axis representing the second voltage. The first axis being perpendicular to the second axis. The voltage point represents a relationship between the first voltage and the second voltage in the two-dimensional coordinate system. The first voltage is boosted in a first mode in a case where the voltage point is determined to be within the referenced closed region. The first voltage is boosted in a second mode in a case where the voltage point is determined to be outside the referenced closed region.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 6 is a flowchart illustrating a battery control process performed by an ECU.

DESCRIPTION OF THE EMBODIMENTS

Figure 1:
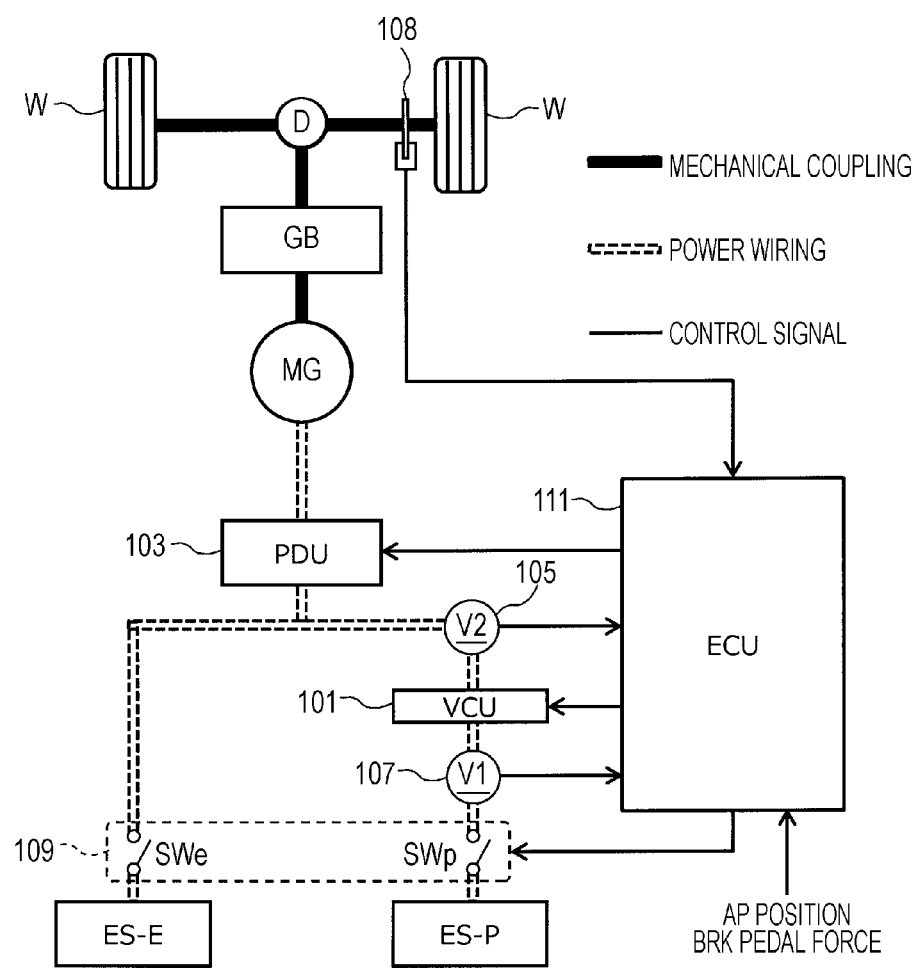
FIG. 1 is a block diagram illustrating an internal configuration of an electric vehicle.

The embodiments will now be described with reference to the accompanying drawings, wherein like reference numerals designate corresponding or identical elements throughout the various drawings.

FIG. 1 is a block diagram illustrating an internal configuration of an electric vehicle. A one-motor (1-MOT) electric vehicle illustrated in FIG. 1 includes a motor generator MG, a high-capacity battery ES-E, a high-power battery ES-P, a voltage control unit (VCU) 101, a power drive unit (PDU) 103, a V2 sensor 105, a V1 sensor 107, a vehicle speed sensor 108, a switch group 109, and an electronic control unit (ECU) 111. In FIG. 1, a thick solid line represents mechanical coupling, a dotted double line represents power wiring, and a thin solid line represents a control signal.

The motor generator MG is driven by power obtained from at least one of the high-capacity battery ES-E and the high-power battery ES-P, and generates power for the electric vehicle to run. A torque generated by the motor generator MG is transmitted through a gearbox GB (variable- or fixed-stage gearbox) and a reduction gear D to drive wheels W. During speed reduction of the electric vehicle, the motor generator MG operates as a motor and outputs a braking force of the electric vehicle. Regenerative power generated by operating the motor generator MG as a motor is stored either in the high-capacity battery ES-E or the high-power battery ES-P.

The high-capacity battery ES-E includes a plurality of rechargeable cells, such as lithium-ion batteries or nickel-metal hydride batteries, and supplies high-voltage power to the motor generator MG. The high-power battery ES-P also includes a plurality of rechargeable cells, such as lithium-ion batteries or nickel-metal hydride batteries, and supplies high-voltage power through the VCU 101 (a booster) to the motor generator MG. The high-power battery ES-P and the high-capacity battery ES-E are connected in parallel to the PDU 103, with the VCU 101 interposed between the high-power battery ES-P and the PDU 103. The voltage of the high-power battery ES-P is lower than the voltage of the high-capacity battery ES-E. Therefore, the power of the high-power battery ES-P is boosted by the VCU 101 to the level of the voltage of the high-capacity battery ES-E, and then supplied through the PDU 103 to the motor generator MG.

Note that the high-capacity battery ES-E and the high-power battery ES-P are not limited to secondary batteries, such as the lithium-ion batteries or nickel-metal hydride batteries described above, or fuel cells or air cells that require external supply of active materials. For example, while being small in storage capacity, a capacitor capable of charging and discharging a large amount of power in a short time may be used as the high-power battery ES-P.

The high-capacity battery ES-E and the high-power battery ES-P differ in characteristics. The high-capacity battery ES-E is lower in power weight density but higher in energy weight density than the high-power battery ES-P. Conversely, the high-power battery ES-P is lower in energy weight density but higher in power weight density than the high-capacity battery ES-E. Thus, the high-capacity battery ES-E is superior in energy weight density, and the high-power battery ES-P is superior in power weight density. Note that the energy weight density is energy per unit weight (Wh/kg), and the power weight density is power per unit weight (W/kg). Therefore, the high-capacity battery ES-E superior in energy weight density is an energy storage which is primarily intended to achieve high capacity, and the high-power battery ES-P superior in power weight density is an energy storage which is primarily intended to achieve high power.

The differences in characteristics between the high-capacity battery ES-E and the high-power battery ES-P are caused by various parameters determined, for example, by the structure and materials of battery components, such as electrodes, active materials, and electrolyte. For example, the high-capacity battery ES-E is superior to the high-power battery ES-P in storage capacity, which is a parameter indicating the total amount of electricity that can be charged and discharged. On the other hand, the high-power battery ES-P is superior to the high-capacity battery ES-E in rate characteristic, which is a parameter indicating the resistance to charge and discharge cycles, and also in internal resistance (impedance), which is a parameter indicating the value of electrical resistance to charge and discharge cycles.

Figure 2:
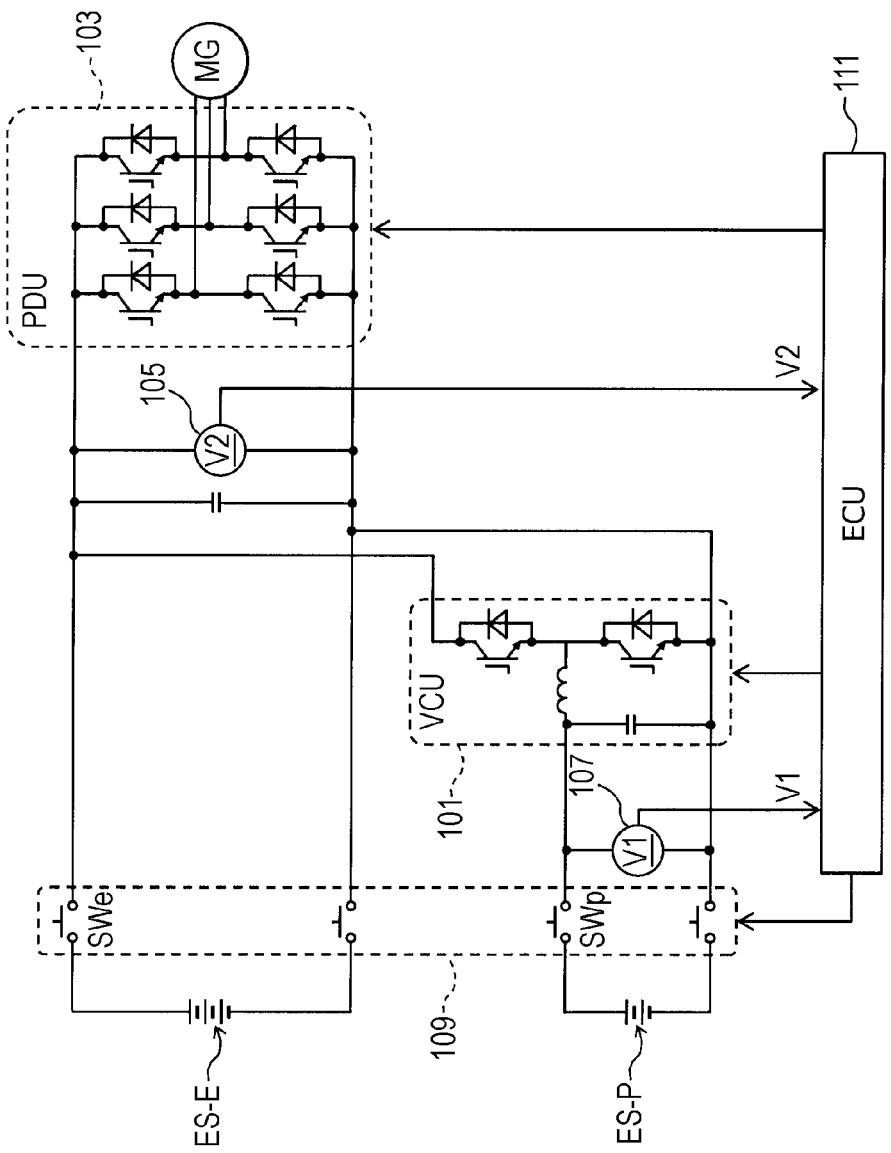
FIG. 2 is an electrical diagram illustrating how a high-capacity battery, a high-power battery, a VCU, a PDU, and a motor generator relate to one another.

The VCU 101 boosts the output voltage of the high-power battery ES-P without converting it from a direct-current (DC) voltage. During speed reduction of the electric vehicle, the VCU 101 lowers the voltage of power generated by the motor generator MG and converted to a DC voltage. The power lowered in voltage by the VCU 101 is charged into the high-power battery ES-P. FIG. 2 is an electrical diagram illustrating how the high-capacity battery ES-E, the high-power battery ES-P, the VCU 101, the PDU 103, and the motor generator MG relate to one another. As illustrated in FIG. 2, the VCU 101 boosts the voltage V1 of the high-power battery ES-P (input voltage) to the level of the voltage V2 of the high-capacity battery ES-E by switching on and off two switching elements thereof.

The PDU 103 converts a DC voltage to an alternating-current (AC) voltage to supply a three-phase current to the motor generator MG. During speed reduction of the electric vehicle, the PDU 103 converts an AC voltage generated by the motor generator MG to a DC voltage.

The V2 sensor 105 detects the voltage V2 of the high-capacity battery ES-E. The voltage V2 detected by the V2 sensor 105 is equal to a value obtained by the VCU 101 by boosting the voltage V1 of the high-power battery ES-P. A signal representing the voltage V2 detected by the V2 sensor 105 is transmitted to the ECU 111 (a controller). The V1 sensor 107 detects the voltage V1 of the high-power battery ES-P. A signal representing the voltage V1 detected by the V1 sensor 107 is transmitted to the ECU 111. The vehicle speed sensor 108 detects the running speed (vehicle speed) VP of the electric vehicle. A signal representing the vehicle speed VP detected by the vehicle speed sensor 108 is transmitted to the ECU 111.

The switch group 109 includes a switch SWe for opening and closing a current path extending from the high-capacity battery ES-E to the PDU 103, and a switch SWp for opening and closing a current path extending from the high-power battery ES-P to the VCU 101. The switches SWe and SWp are each turned on or off in response to a result of battery selection by the ECU 111.

The ECU 111 controls the VCU 101 and the PDU 103, controls the charge and discharge between the motor generator MG and the high-power battery ES-P and high-capacity battery ES-E, and controls the ON and OFF of the switch group 109. Also, the ECU 111 derives a required driving force or a required braking force for the motor generator MG on the basis of the vehicle speed VP represented by the signal obtained from the vehicle speed sensor 108, and an accelerator pedal position (AP position) corresponding to the accelerator pedal operation by the electric vehicle driver or a brake pedal force (BRK pedal force) applied by the driver. The details of the ECU 111 will be described later on.

Next, how the high-capacity battery ES-E and the high-power battery ES-P are used will be described.

The high-power battery ES-P supplies power to the motor generator MG when a large driving force is required for travel of the electric vehicle. The high-capacity battery ES-E supplies constant power to the motor generator MG at all times during travel of the electric vehicle. Regenerative power generated by the motor generator MG is preferentially input to the high-power battery ES-P. As a result, the state of charge (SOC) of the high-capacity battery ES-E continuously decreases as the electric vehicle travels. On the other hand, the SOC of the high-power battery ES-P stays at around an intermediate value.

A control operation that allows exchange of power with the motor generator MG or the other battery by taking advantage of the different characteristics of the high-power battery ES-P and the high-capacity battery ES-E, as described above, is referred to as "power distribution control". In the present embodiment, the power distribution control is performed by the VCU 101 by boosting or lowering the voltage of power input to, and output from, the high-power battery ES-P.

Figure 3:
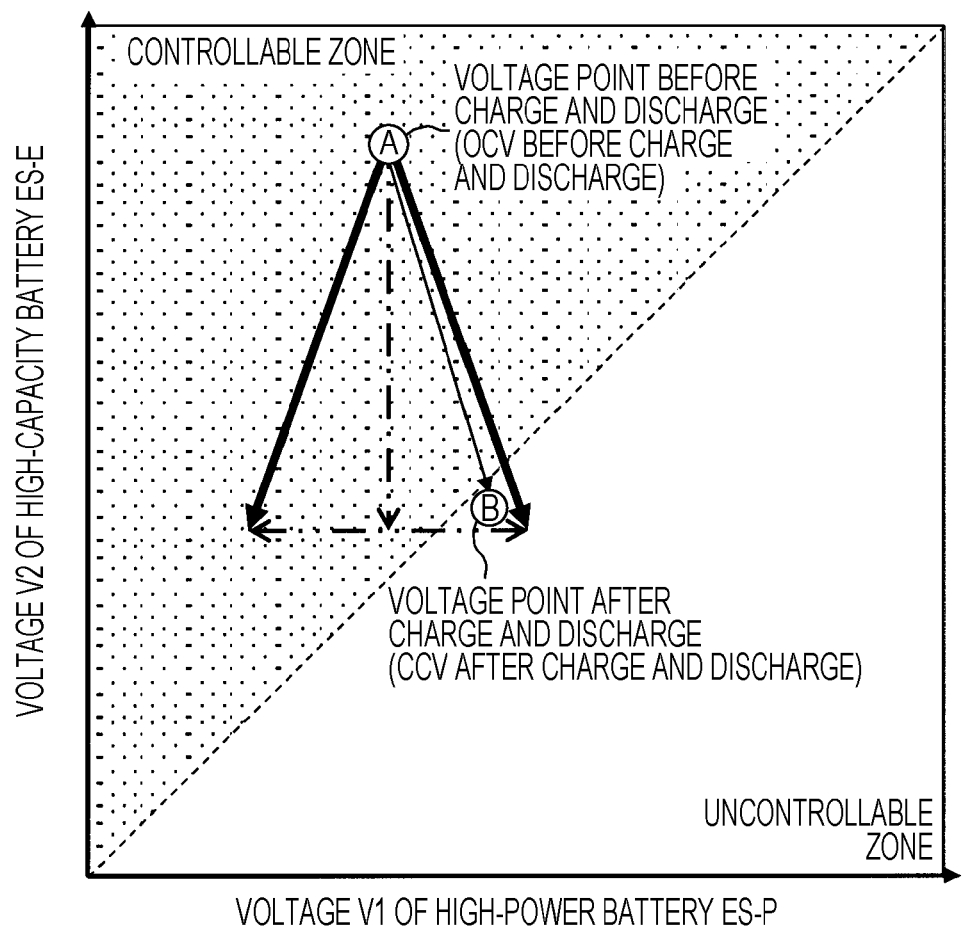
FIG. 3 illustrates two zones based on the relationship between the voltage of the high-capacity battery and the voltage of the high-power battery, and also illustrates how a voltage point moves from "before" to "after" charge and discharge.

In the electric vehicle of the present embodiment, the high-capacity battery ES-E and the high-power battery ES-P are connected in parallel to the PDU 103. While the voltage V2 of the high-capacity battery ES-E is directly input to the PDU 103, the voltage V1 of the high-power battery ES-P lower than the voltage V2 of the high-capacity battery ES-E is input to the PDU 103 after being boosted by the VCU 101 to the level of the voltage V2 of the high-capacity battery ES-E. Therefore, if the voltage V2 of the high-capacity battery ES-E is not higher than the voltage V1 of the high-power battery ES-P, control over the configuration of at least the present embodiment is not established and fails. FIG. 3 illustrates two zones based on the relationship between the voltage V2 of the high-capacity battery ES-E and the voltage V1 of the high-power battery ES-P. Of the two zones, a shaded zone is referred to as "controllable zone", and a non-shaded zone is referred to as "uncontrollable zone".

In FIG. 3, a region where the voltage V2 of the high-capacity battery ES-E is higher than the voltage V1 of the high-power battery ES-P is collectively defined as the "controllable zone". However, as described below, it is necessary in practice to take into account the maximum boosting ratio and the minimum boosting ratio of the VCU 101 that are greater than one. The "controllable zone" which takes into account these boosting ratios is located inside, and is smaller than, the "controllable zone" in FIG. 3.

FIG. 3 shows a two-dimensional coordinate system using the voltage V1 of the high-power battery ES-P and the voltage V2 of the high-capacity battery ES-E as variables. In FIG. 3, the horizontal axis represents the voltage V1 of the high-power battery ES-P, and the vertical axis represents the voltage V2 of the high-capacity battery ES-E. In the two-dimensional coordinate system, the voltage V2 of the high-capacity battery ES-E increases upward, and is shifted upward by charge or regeneration and shifted downward by discharge. Also in the two-dimensional coordinate system, the voltage V1 of the high-power battery ES-P increases to the right, and is shifted to the right by charge or regeneration and shifted to the left by discharge.

As described above, the two-dimensional coordinate system of FIG. 3 uses the voltage V1 of the high-power battery ES-P and the voltage V2 of the high-capacity battery ES-E as variables. Therefore, a point (hereinafter referred to as "voltage point") representing the relationship between the voltage V2 of the high-capacity battery ES-E and the voltage V1 of the high-power battery ES-P is moved in the two-dimensional coordinate system by charge and discharge of the high-capacity battery ES-E and the high-power battery ES-P.

For example, when the high-capacity battery ES-E is discharged and the high-power battery ES-P is charged or regenerated, the voltage point is represented by a vector directed toward the lower right. Specifically, the vector combines the downward movement associated with the discharge of the high-capacity battery ES-E and the rightward movement associated with the charge or regeneration of the high-power battery ES-P. In this case, the voltage point may enter the uncontrollable zone. On the other hand, when the high-capacity battery ES-E and the high-power battery ES-P are discharged, the voltage point is represented by a vector directed toward the lower left. Specifically, the vector combines the downward movement associated with the discharge of the high-capacity battery ES-E and the leftward movement associated with the discharge of the high-power battery ES-P.

As described above, the SOC of the high-capacity battery ES-E continuously decreases, whereas the SOC of the high-power battery ES-P stays at around an intermediate value. Thus, the voltage V2 of the high-capacity battery ES-E decreases as indicated by a dot-and-dash arrow in FIG. 3, and the voltage V1 of the high-power battery ES-P varies around a predetermined value as indicated by a two-dot chain arrow in FIG. 3. Therefore, as the charge and discharge of these two batteries progresses, the voltage point tends to move toward a range defined by two vectors indicated by thick lines. Assume that the electric vehicle starts to run when the voltages of the two batteries that are not yet charged or discharged (open circuit voltages or OCVs) have a relationship represented by voltage point A in FIG. 3. In this case, when the charge and discharge of the two batteries progresses, the voltages of the two charged and discharged batteries (closed circuit voltages or CCVs) may have a relationship represented by voltage point B in FIG. 3. As a result, control over the configuration of the present embodiment may not be established and may fail.

The controllable zone illustrated in FIG. 3 will now be described in detail with reference to FIGS. 4 and 5.

Figure 4:
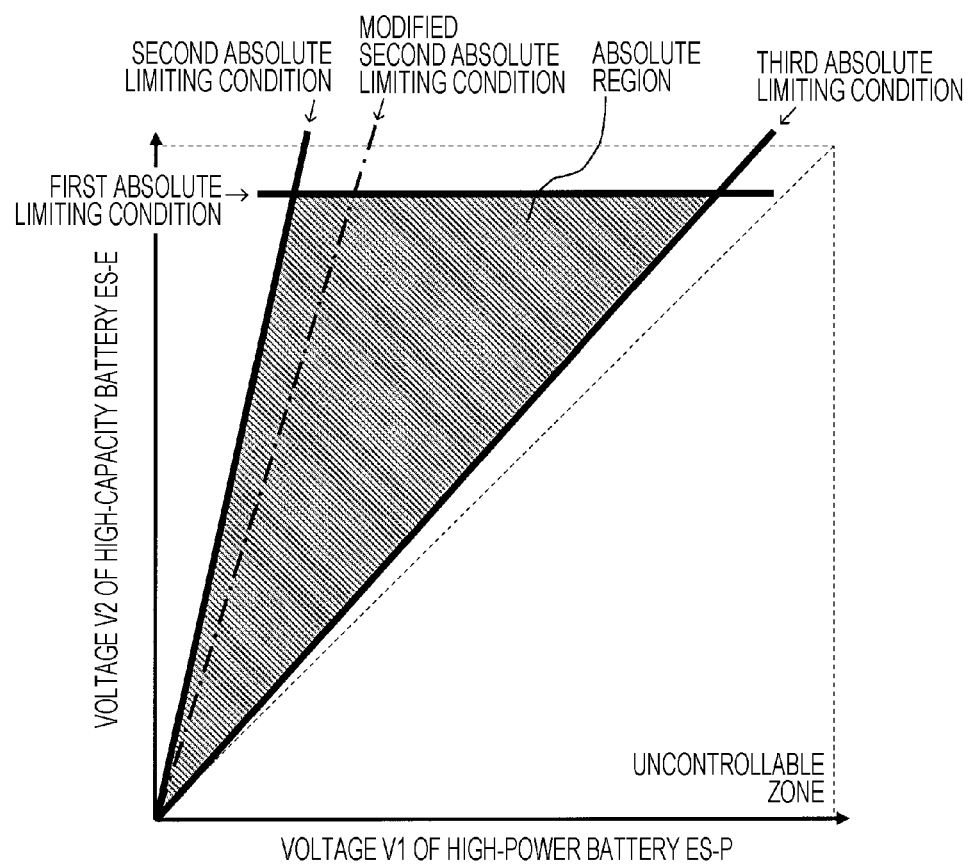
FIG. 4 illustrates an absolute region that satisfies all first to third absolute limiting conditions within a controllable zone.

A hatched region in FIG. 4 is a region (hereinafter referred to as "absolute region") which satisfies all first to third absolute limiting conditions within the controllable zone. If a voltage point is within the absolute region, both the high-power battery ES-P and the high-capacity battery ES-E can supply power to the motor generator MG at the same time, whereas if the voltage point is outside the absolute region, only the high-capacity battery ES-E can supply power to the motor generator MG.

The first absolute limiting condition is that the voltage V2 of the high-capacity battery ES-E does not exceed the withstand voltage limits of the motor generator MG and the PDU 103. As illustrated in FIG. 2, there is no voltage regulator between the high-capacity battery ES-E and the motor generator MG and PDU 103. This means that the motor generator MG and the PDU 103 cannot be protected if the voltage V2 of the high-capacity battery ES-E exceeds the withstand voltage limits of the motor generator MG and the PDU 103.

The second absolute limiting condition is that the voltage V2 of the high-capacity battery ES-E is lower than or equal to a value obtained by the VCU 101 by multiplying the voltage V1 of the high-power battery ES-P by a boosting ratio of 4 (V2≤4× V1). This boosting ratio, 4, is an exemplary maximum value (maximum boosting ratio) at which the capability to establish control over the VCU 101 can be ensured with high probability. Ensuring the capability to establish control over the VCU 101 means to ensure linearity of the boosting ratio with respect to the duty ratio of the VCU 101 which is pulse width modulation (PWM)-controlled. If the voltage V2 of the high-capacity battery ES-E is higher than a value obtained by multiplying the voltage V1 of the high-power battery ES-P by the maximum boosting ratio, the high-power battery ES-P cannot supply power to the high-capacity battery ES-E and the motor generator MG, and hence the control fails.

The maximum boosting ratio varies depending on the VCU 101. This means that selection of the high-capacity battery ES-E and the high-power battery ES-P needs to be preceded by selection of the VCU 101. In other words, together with the third absolute limiting condition (described below), the performance of the selected VCU 101 has a dominant influence on the selection of the high-capacity battery ES-E and the high-power battery ES-P.

The third absolute limiting condition is that the voltage V2 of the high-capacity battery ES-E is higher than or equal to a value obtained by the VCU 101 by multiplying the voltage V1 of the high-power battery ES-P by a boosting ratio of 1.09 (V2≧1.09×V1). This boosting ratio, 1.09, is an exemplary minimum boosting ratio of the VCU 101 and varies depending on the VCU 101. This boosting ratio can be obtained by adding up the tolerance of a chip forming the VCU 101, the detection error of the V2 sensor 105, and the detection error of the V1 sensor 107. If the voltage V2 of the high-capacity battery ES-E is lower than a value obtained by multiplying the voltage V1 of the high-power battery ES-P by the minimum boosting ratio, the high-capacity battery ES-E cannot supply power to the high-power battery ES-P and the motor generator MG, and hence the control fails. The minimum boosting ratio of the VCU 101 is inevitably produced by individual variation of the VCU 101.

Instead of the second absolute limiting condition, a modified second absolute limiting condition indicated by a dot-and-dash line in FIG. 4 may be used. The modified second absolute limiting condition is that the voltage V2 of the high-capacity battery ES-E is lower than or equal to a value obtained by the VCU 101 by multiplying the voltage V1 of the high-power battery ES-P by a boosting ratio of 3 (V2≦3×V1). This boosting ratio, 3, is an exemplary maximum value at which the capability to establish control over the VCU 101 can be reliably ensured. Using the modified second absolute limiting condition, instead of the second absolute limiting condition, reduces the number of selectable combinations of the high-capacity battery ES-E and the high-power battery ES-P, but improves the stability of control. Additionally, since the voltage point becomes closer to the center of the controllable zone, the capability to establish the control can be more reliably ensured.

Figure 5:
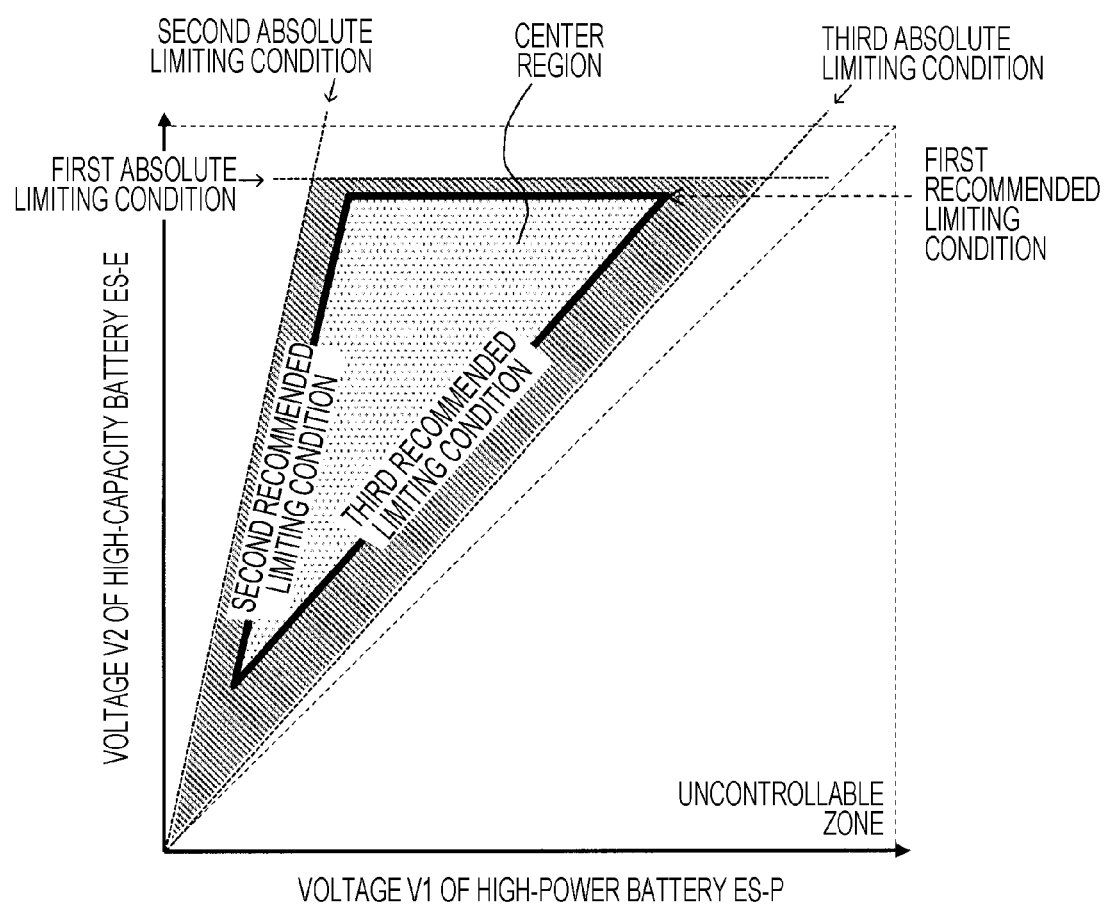
FIG. 5 illustrates the absolute region and a center region that satisfies all first to third recommended limiting conditions within the controllable zone.

A dotted region in FIG. 5 is a region (hereinafter referred to as "center region") which satisfies all first to third recommended limiting conditions within the controllable zone. Note that the hatched region in FIG. 5 is the absolute region illustrated in FIG. 4. The first recommended limiting condition is that the voltage V2 of the high-capacity battery ES-E is lower than or equal to a value obtained by setting a margin from the first absolute limiting condition toward the inside of the controllable zone. The second recommended limiting condition is that the voltage V2 of the high-capacity battery ES-E is lower than or equal to a value obtained by setting a margin from the second absolute limiting condition toward the inside of the controllable zone such that the boosting ratio of the VCU 101 is decreased. The third recommended limiting condition is that the voltage V2 of the high-capacity battery ES-E is higher than or equal to a value obtained by setting a margin from the third absolute limiting condition toward the inside of the controllable zone such that the boosting ratio of the VCU 101 is increased.

Although the second recommended limiting condition is set on the basis of the second absolute limiting condition in FIG. 5, the modified second absolute limiting condition may be used instead of the second absolute limiting condition. Setting the second recommended limiting condition on the basis of the modified second absolute limiting condition, instead of the second absolute limiting condition, reduces the number of selectable combinations of the high-capacity battery ES-E and the high-power battery ES-P, but improves the stability of control. Additionally, since the voltage point becomes closer to the center of the controllable zone, the capability to establish the control can be more reliably ensured.

The margin set between the first absolute limiting condition and the first recommended limiting condition is hereinafter referred to as "first margin". The margin set between the second absolute limiting condition and the second recommended limiting condition is hereinafter referred to as "second margin". The margin set between the third absolute limiting condition and the third recommended limiting condition is hereinafter referred to as "third margin". Of these three margins, the first margin is the smallest, the third margin is the largest, and the second margin is between the first margin and the third margin in size. These size differences of the margins are based on the tendency of movement of the voltage point illustrated in FIG. 3.

As described above, the regenerative power generated by the motor generator MG is preferentially input to the high-power battery ES-P. Therefore, as the charge and discharge of the two batteries progresses, it becomes difficult for the voltage point to move in the direction in which the voltage V2 increases. Hence, the first margin is the smallest as described above.

The SOC of the high-power battery ES-P stays at around an intermediate value, whereas the SOC of the high-capacity battery ES-E continuously decreases as the electric vehicle travels. Therefore, the smaller the slope of a line representing a condition in FIG. 4, the more likely a voltage point satisfying the condition is to be moved out of the center region by the charge and discharge of the high-capacity battery ES-E and the high-power battery ES-P.

The slope of the line representing the second absolute limiting condition in FIG. 4 is 4 (or 3 in the case of using the modified second absolute limiting condition), and the slope of the line representing the third absolute limiting condition in FIG. 4 is 1.09. Hence, the slope of the line representing the third absolute limiting condition is the smallest, and the third margin is the largest.

In FIG. 5, larger margins are not necessarily better. The larger the first to third margins, the closer the voltage point is to the center of the controllable zone. At the same time, however, the larger the first to third margins, the smaller the number of selectable combinations of the high-capacity battery ES-E and the high-power battery ES-P. Therefore, the first to third margins need to be set appropriately in accordance with battery characteristics.

In the present embodiment, the ECU 111 performs battery control such that a voltage point representing the relationship between the voltage V2 of the high-capacity battery ES-E and the voltage V1 of the high-power battery ES-P does not exit the absolute region. If the voltage point exits the absolute region, the ECU 111 performs specific control. FIG. 6 is a flowchart illustrating a battery control process performed by the ECU 111.

As illustrated in FIG. 6, the ECU 111 derives a required driving force or required braking force for the motor generator MG, on the basis of the vehicle speed VP represented by a signal from the vehicle speed sensor 108, and an AP position corresponding to the accelerator pedal operation by the electric vehicle driver or a BRK pedal force applied by the driver (step S101).

Next, the ECU 111 calculates the voltage V2 of the high-capacity battery ES-E and the voltage V1 of the high-power battery ES-P from the battery states, such as the SOC of the high-capacity battery ES-E and the SOC of the high-power battery ES-P (step S102).

Next, on the basis of the required driving force or required braking force, and also of the voltage V1 and the voltage V2, the ECU 111 calculates a target voltage V2' of the high-capacity battery ES-E for satisfying the required driving force or required braking force (step S103).

Next, the ECU 111 calculates a boosting ratio of the VCU 101 corresponding to the voltage V1 calculated in step S102 and the target voltage V2' calculated in step S103 (step S105). The boosting ratio is calculated by solving the equation "boosting ratio=target voltage V2' of high-capacity battery ES-E/voltage V1 of high-power battery ES-P". Since the high-capacity battery ES-E and the high-power battery ES-P are selected such that the first to third absolute limiting conditions are satisfied, the boosting ratio is generally greater than one.

Next, the ECU 111 determines whether a voltage point representing the relationship between the voltage V2 of the high-capacity battery ES-E and the voltage V1 of the high-power battery ES-P is within the absolute region illustrated in FIG. 4 (step S107). If the voltage point is within the absolute region, the process proceeds to step S109, and if not, the ECU 111 performs a subroutine (emergency control) in step S115. In step S109, the ECU 111 determines whether the voltage point is within the center region illustrated in FIG. 5. If the voltage point is within the center region, the ECU 111 performs a subroutine (normal control) in step S111, and if not, the ECU 111 performs a subroutine (power save control) in step S113.

Figure 7C:
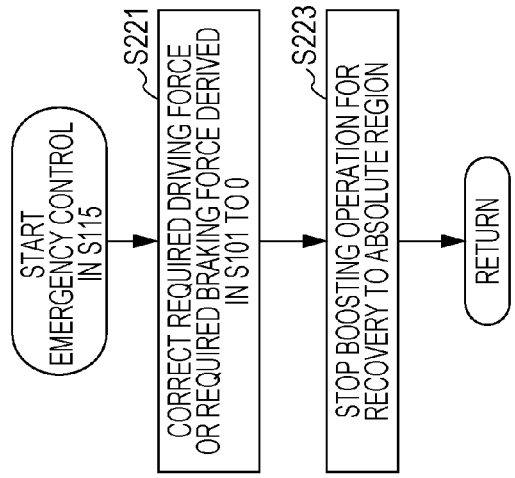
FIGS. 7A to 7C each illustrate a subroutine of the battery control process performed by the ECU.
Figure 7B:
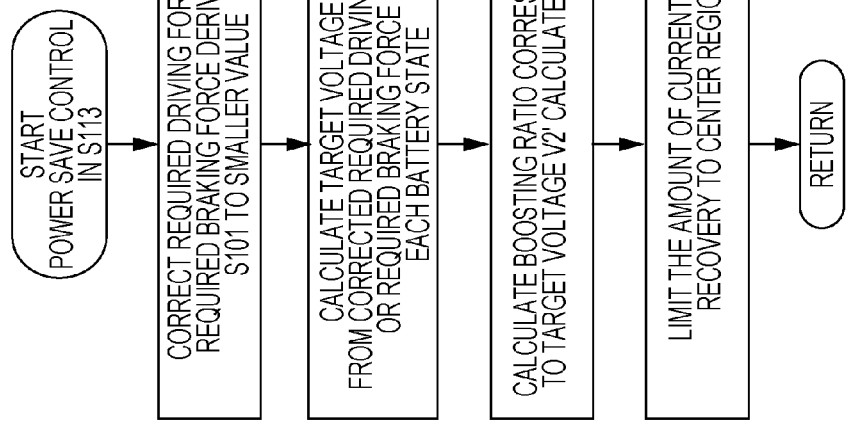
Figure 7A:
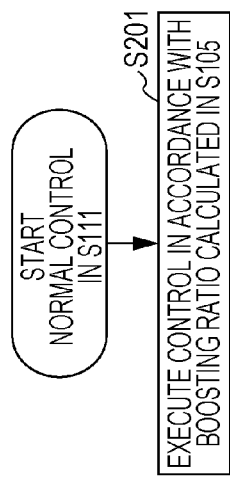

In the subroutine for the normal control in step S111, as illustrated in FIG. 7A, the ECU 111 controls the VCU 101 and the PDU 103 in accordance with the boosting ratio calculated in step S105 (step S201).

In the subroutine for the power save control in step S113, as illustrated in FIG. 7B, the ECU 111 corrects the required driving force or required braking force derived in step S101 to a smaller value (step S211). Next, the ECU 111 calculates the target voltage V2' again from the corrected required driving force or required braking force and the battery state of each of the high-capacity battery ES-E and the high-power battery ES-P (step S213). Next, the ECU 111 calculates a boosting ratio of the VCU 101 corresponding to the target voltage V2' calculated in step S213 (step S215). Then, the ECU 111 controls the VCU 101 and the PDU 103 in accordance with the boosting ratio calculated in step S215 to limit the amount of current (step S217). Through this control, the ECU 111 can restrict the movement of the voltage point beyond the absolute region illustrated in FIG. 4, and can bring the voltage point back to the center region illustrated in FIG. 5.

In step S217, the ECU 111 may control the VCU 101 to limit the amount of current discharged from the high-power battery ES-P and charged into the high-power battery ES-P. By limiting the amount of current, the situation where the second absolute limiting condition is no longer satisfied can be reduced.

By limiting both the required driving force or required braking force and the amount of current charged into and discharged from the high-power battery ES-P, the movement of the voltage point beyond the absolute region can be more effectively restricted.

In the subroutine for the power save control, the ECU 111 performs control in accordance with the boosting ratio corresponding to the target voltage V2' calculated from the required driving force or required braking force corrected to a smaller value. It is thus possible to restrict the movement of the voltage point from the inside to the outside of the absolute region, and bring the voltage point back to the center region where normal control is possible.

In the subroutine for the emergency control in step S115, as illustrated in FIG. 7C, the ECU 111 corrects the required driving force or required braking force derived in step S101 to 0 (step S221).

In the uncontrollable zone illustrated in FIG. 3, the voltage V1 of the high-power battery ES-P is higher than the voltage V2 of the high-capacity battery ES-E. Therefore, even when the high-capacity battery ES-E is discharged by controlling the VCU 101 on the basis of the required driving force, the power is drawn to the high-capacity battery ES-E. As a result, since a sufficient amount of power is not supplied to the motor generator MG, a request for the required driving force is continuously sent to the ECU 111 and power is endlessly taken from the high-power battery ES-P. To prevent this, as described in step S221, the ECU 111 needs to correct the required driving force or required braking force derived in step S101 to 0.

Next, since the required driving force or required braking force is 0, the ECU 111 turns an upper arm switch forming the VCU 101 to the ON state and turns a lower arm switch to the OFF state to stop the boosting operation of the VCU 101, thereby controlling the current such that the high-capacity battery ES-E and the high-power battery ES-P are directly connected to each other (step S223). Through this control, the power moves from the high-capacity battery ES-E to the high-power battery ES-P to equalize the voltage between the high-capacity battery ES-E and the high-power battery ES-P. The high-capacity battery ES-E and the high-power battery ES-P may be directly connected simply by stopping the duty control that periodically switches the ON/OFF state of the upper and lower arm switches of the VCU 101. In this case, the upper arm switch may remain in the OFF state.

The effect of the emergency control performed when a voltage point is in the uncontrollable zone will now be described with reference to FIG. 3. In the uncontrollable zone illustrated in FIG. 3, the voltage of the high-capacity battery ES-E is lower than the voltage of the high-power battery ES-P. Therefore, by performing the emergency control described above, electricity flows from the high-power battery ES-P having a higher voltage to the high-capacity battery ES-E without boosting the voltage. Since the high-power battery ES-P is discharged, the voltage of the high-power battery ES-P represented by the horizontal axis in FIG. 3 decreases and is shifted to the left. On the other hand, since the high-capacity battery ES-E is charged, the voltage of the high-capacity battery ES-E represented by the vertical axis in FIG. 3 increases and is shifted upward. The movement of the voltage point in FIG. 3 is represented by a composite of changes in the voltages of the high-capacity battery ES-E and the high-power battery ES-P. Since power transfer between the high-capacity battery ES-E and the high-power battery ES-P continues, the voltage point is moved from the uncontrollable zone toward the boundary with the controllable zone (i.e., toward the upper left) in FIG. 3. Thus, in the subroutine for the emergency control, the voltage point can be returned to the absolute region.

As described above, in the present embodiment, when the charge and discharge of the high-capacity battery ES-E and the high-power battery ES-P is performed, if a voltage point representing the relationship between the voltage V2 of the high-capacity battery ES-E and the voltage V1 of the high-power battery ES-P is within the center region illustrated in FIG. 5, the ECU 111 performs the normal control illustrated in FIG. 7A. Also, if the voltage point is in the absolute region illustrated in FIG. 4, the ECU 111 performs the power save control illustrated in FIG. 7B. Thus, if the voltage point is in the absolute region but outside the center region, the power save control is performed in accordance with the target voltage V2' corresponding to the required driving force or required braking force corrected to a small value, so that the movement of the voltage point from the inside to the outside of the absolute region can be restricted. If the voltage point is outside the absolute region, particularly in the uncontrollable zone illustrated in FIG. 3, the ECU 111 performs the emergency control illustrated in FIG. 7C. Thus, since the emergency control is performed even if the voltage point exits the absolute region and enters the uncontrollable zone, the voltage point can be returned to the absolute region. As described above, in the present embodiment, even when these two batteries are charged and discharged, it is possible to ensure the capability to establish control related to the charge and discharge of the two batteries.

When the voltage point is in the absolute region, the first to third absolute limiting conditions are all satisfied. Hence, the ECU 111 controls the VCU 101 and the PDU 103 after the capability to establish the control is fully ensured.

If the voltage point is within the center region, which is located inside (and around the center of) the controllable zone and defined by adding margins to the first to third absolute limiting conditions, the first to third recommended limiting conditions are all satisfied. Even when a voltage point representing the relationship between the voltage V2 of the high-capacity battery ES-E and the voltage V1 of the high-power battery ES-P moves from the controllable zone toward the uncontrollable zone, the margins added to the first to third absolute limiting conditions at the boundary between the controllable zone and the uncontrollable zone serve as a buffer to prevent entry into the uncontrollable zone. Hence, the ECU 111 controls the VCU 101 and the PDU 103 after a very high capability to establish the control is ensured.

The present disclosure is not limited to the embodiments described above, and appropriate modifications and improvements may be made thereto. For example, although the electric vehicle described above is a 1-MOT electric vehicle (EV), the electric vehicle may be an EV including a plurality of motor generators, a hybrid electric vehicle (HEV) including an internal combustion engine along with at least one motor generator, or a fuel cell vehicle (FCV).

A drive device according to a first aspect of the present disclosure includes a first energy storage (e.g., high-power battery ES-P in the above embodiment), a second energy storage (e.g., high-capacity battery ES-E in the above embodiment) superior to the first energy storage in energy weight density and inferior to the first energy storage in power weight density, a boosting unit (e.g., VCU 101 in the above embodiment) configured to boost an output voltage of the first energy storage to perform power distribution control, a motor (e.g., motor generator MG in the above embodiment) driven by power obtained from at least one of the first energy storage and the second energy storage, and a control unit (e.g., ECU 111 in the above embodiment) configured to control the boosting unit. The control unit performs a first mode of control (e.g., normal control or power save control in the above embodiment) if a voltage point representing a relationship between a voltage of the first energy storage and a voltage of the second energy storage is within a predetermined closed region (e.g., absolute region in the above embodiment) in a two-dimensional coordinate system using the voltage of the first energy storage and the voltage of the second energy storage as variables, and performs a second mode of control (e.g., emergency control in the above embodiment) different from the first mode of control if the voltage point is outside the closed region.

According to a second aspect of the present disclosure, in the first aspect described above, if the voltage point is within the closed region, both the first energy storage and the second energy storage may be able to supply power to the motor at the same time.

According to a third aspect of the present disclosure, in the first aspect described above, if the voltage point is outside the closed region, only the second energy storage may be able to supply power to the motor.

According to a fourth aspect of the present disclosure, in the first aspect described above, the control unit may derive a required driving force or a required braking force for the motor. If the voltage point is within a center region inside the closed region, the center region being spaced by a margin region from a boundary between an inside and an outside of the closed region, the control unit may perform a mode of control (e.g., normal control in the above embodiment) which is the first mode of control and satisfies the required driving force or required braking force.

According to a fifth aspect of the present disclosure, in the fourth aspect described above, if the voltage point is in the margin region, the control unit may perform a mode of control (e.g., power save control in the above embodiment) which is the first mode of control and does not satisfy the required driving force or required braking force.

According to a sixth aspect of the present disclosure, in the fifth aspect described above, in the mode of control that does not satisfy the required driving force or required braking force, the control unit may make the amount of current discharged from the first energy storage through the boosting unit or the amount of current charged into the first energy storage through the boosting unit smaller than that in the mode of control satisfying the required driving force or required braking force.

According to a seventh aspect of the present disclosure, in the first aspect described above, if the voltage point is outside the closed region, the control unit may perform the second mode of control that allows power exchange between the first energy storage and the second energy storage.

According to an eighth aspect of the present disclosure, in the first aspect described above, the closed region may be a region that satisfies, in the two-dimensional coordinate system, all the following conditions: a first condition (e.g., first absolute limiting condition in the above embodiment) which is that the voltage of the second energy storage does not exceed a withstand voltage limit of the motor, a second condition (e.g., second absolute limiting condition in the above embodiment) which is that the voltage of the second energy storage is lower than or equal to a value obtained by the boosting unit by multiplying the voltage of the first energy storage by a maximum boosting ratio, and a third condition (e.g., third absolute limiting condition in the above embodiment) which is that the voltage of the second energy storage is higher than or equal to a value obtained by the boosting unit by multiplying the voltage of the first energy storage by a minimum boosting ratio.

According to a ninth aspect of the present disclosure, in the eighth aspect described above, the maximum boosting ratio may be a limit value at which a capability of the control unit to establish control over the boosting unit can be ensured.

According to a tenth aspect of the present disclosure, in the eighth aspect described above, the drive device may further include a first sensor (e.g., V1 sensor 107 in the above embodiment) configured to detect the voltage of the first energy storage, and a second sensor (e.g., V2 sensor 105 in the above embodiment) configured to detect a value obtained by the boosting unit by boosting the voltage of the first energy storage. The minimum boosting ratio may be a value based on a product tolerance of the boosting unit and detection errors of the first sensor and the second sensor.

According to an eleventh aspect of the present disclosure, in the eighth aspect described above, the center region may be a region that satisfies, in the two-dimensional coordinate system, all the following conditions: a first recommended condition (e.g., first recommended limiting condition in the above embodiment) which is that the voltage of the second energy storage is lower than or equal to a value obtained by setting a first margin with respect to the first condition, a second recommended condition (e.g., second recommended limiting condition in the above embodiment) which is that the voltage of the second energy storage is lower than or equal to a value obtained by setting a second margin with respect to the second condition such that the boosting ratio of the boosting unit is decreased, and a third recommended condition (e.g., third recommended limiting condition in the above embodiment) which is that the voltage of the second energy storage is higher than or equal to a value obtained by setting a third margin with respect to the third condition such that the boosting ratio of the boosting unit is increased.

According to a twelfth aspect of the present disclosure, in the eleventh aspect described above, the first margin, the second margin, and the third margin may differ in size.

According to a thirteenth aspect of the present disclosure, in the twelfth aspect described above, the first margin may be the smallest and the third margin may be the largest of the first, second, and third margins.

A transport apparatus according to a fourteenth aspect of the present disclosure includes the drive device according to the first aspect described above.

An energy storage control method according to a fifteenth aspect of the present disclosure is performed in a drive device including a first energy storage (e.g., high-power battery ES-P in the above embodiment), a second energy storage (e.g., high-capacity battery ES-E in the above embodiment) superior to the first energy storage in energy weight density and inferior to the first energy storage in power weight density, a boosting unit (e.g., VCU 101 in the above embodiment) configured to boost an output voltage of the first energy storage to perform power distribution control, a motor (e.g., motor generator MG in the above embodiment) driven by power obtained from at least one of the first energy storage and the second energy storage, and a control unit (e.g., ECU 111 in the above embodiment) configured to control the boosting unit. The control unit performs a first mode of control (e.g., normal control or power save control in the above embodiment) if a voltage point representing a relationship between a voltage of the first energy storage and a voltage of the second energy storage is within a predetermined closed region (e.g., absolute region in the above embodiment) in a two-dimensional coordinate system using the voltage of the first energy storage and the voltage of the second energy storage as variables, and performs a second mode of control (e.g., emergency control in the above embodiment) different from the first mode of control if the voltage point is outside the closed region.

According to the first, fourteenth, and fifteenth aspects of the present disclosure, the control unit executes a different type of control related to charge and discharge, in accordance with the relationship between the voltages of the first energy storage and the second energy storage. Thus, even when the relationship between the voltages of the first energy storage and the second energy storage is changed by charge and discharge, the capability to establish control related to charge and discharge of the two energy storages can be ensured.

According to the second aspect of the present disclosure, the first mode of control is executed when both the first energy storage and the second energy storage supply power to the motor. It is thus possible to drive the motor using the two energy storages of different characteristics while ensuring the capability to establish control related to charge and discharge of the two energy storages.

According to the third aspect of the present disclosure, the second mode of control different from the first mode of control is executed when only the second energy storage supplies power to the motor. Thus, the capability to establish control related to charge and discharge of the two energy storages can be restored.

According to the fourth aspect of the present disclosure, it is possible to appropriately drive the motor on the basis of the required driving force or required braking force while taking into account the capability to establish control.

According to the fifth aspect of the present disclosure, limiting the required driving force or required braking force can reduce the movement of the voltage point representing the relationship between the voltage of the first energy storage and the voltage of the second energy storage, and thus can restrict the movement of the voltage point to the outside of the closed region.

According to the sixth aspect of the present disclosure, limiting the charge and discharge current of the first energy storage can reduce the horizontal movement of the voltage point representing the relationship between the voltage of the first energy storage and the voltage of the second energy storage, and thus can restrict the movement of the voltage point to the outside of the closed region.

According to the seventh aspect of the present disclosure, the voltage point can be returned to the closed region.

According to the eighth aspect of the present disclosure, when the voltage point is within the closed region, the first to third conditions are all satisfied. Thus, the control unit can control the boosting unit after the capability to establish the control is fully ensured. In a controllable zone which satisfies the first to third conditions, the first energy storage can exchange power with the second energy storage and the motor through the boosting unit. Thus, control related to charge and discharge is established, which takes advantage of the different characteristics of the first energy storage and the second energy storage.

According to the ninth aspect of the present disclosure, the capability to establish control related to charge and discharge of the two energy storages can be ensured by taking into account the capability of the control unit to establish control over the boosting unit.

According to the tenth aspect of the present disclosure, the capability to establish control related to charge and discharge of the two energy storages can be ensured by taking into account the minimum boosting ratio which is greater than one and inevitably produced by variation of the boosting unit associated with the boosting ratio.

According to the eleventh aspect of the present disclosure, when the voltage point is within the center region, which is located inside (and around the center of) the controllable zone and defined by adding margins to the first to third conditions, the first to third recommended conditions are all satisfied. Therefore, even when the voltage point representing the relationship between the voltage of the first energy storage and the voltage of the second energy storage moves from the controllable zone toward an uncontrollable zone, the margins added to the first to third conditions at the boundary between the controllable zone and the uncontrollable zone serve as a buffer to prevent entry into the uncontrollable zone. Hence, the control unit can control the boosting unit after a very high capability to establish the control is ensured.

According to the twelfth aspect of the present disclosure, the capability to establish control related to charge and discharge of the two energy storages can be appropriately ensured by taking into account the tendency of movement of the voltage point from "before" to "after" charge and discharge.

According to the thirteenth aspect of the present disclosure, the margins are appropriately set by taking into account the tendency of movement of the voltage point from "before" to "after" charge and discharge. Thus, the capability to establish control related to charge and discharge of the two energy storages can be more appropriately ensured.

Obviously, numerous modifications and variations of the present invention are possible in light of the above teachings. It is therefore to be understood that within the scope of the appended claims, the invention may be practiced otherwise than as specifically described herein.

What is claimed is:

1. A drive device comprising:
a first energy storage;
a second energy storage which is superior to the first energy storage in energy to weight density and inferior to the first energy storage in power to weight density;
a booster to boost a first voltage output from the first energy storage;
a motor to be driven by power output from at least one of the first energy storage and the second energy storage; and
a controller to control the booster to operate in a first mode while a voltage point is within a referenced closed region and to operate in a second mode while the voltage point is outside the referenced closed region, the voltage point representing a relationship between the first voltage and a second voltage output from the second energy storage in a two-dimensional coordinate system having a first axis representing the first voltage and having a second axis representing the second voltage, the first axis being perpendicular to the second axis.

2. The drive device according to claim 1, wherein while the voltage point is within the referenced closed region, power is suppliable from both the first energy storage and the second energy storage to the motor simultaneously.

3. The drive device according to claim 1, wherein while the voltage point is outside the referenced closed region, power is suppliable only from the second energy storage to the motor.

4. The drive device according to claim 1, wherein the controller derives a required driving force or a required braking force for the motor; and
while the voltage point is within a center region which is inside the referenced closed region, the center region being spaced by a margin region from a boundary defining the referenced closed region, the controller controls the booster to operate in the first mode such that the motor generates a driving force more than or equal to the required driving force or that the motor generates a braking force more than or equal to the required braking force.

5. The drive device according to claim 4, wherein while the voltage point is in the margin region, the controller controls the booster to operate in the first mode such that the motor generates a driving force less than the required driving force or that the motor generates a braking force less than the required braking force.

6. The drive device according to claim 5, wherein while the booster is controlled such that the motor generates a driving force less than the required driving force or that the motor generates a braking force less than the required braking force, the controller controls a first amount of current discharged from the first energy storage through the boosting unit or a second amount of current charged into the first energy storage through the boosting unit smaller than the first amount or the second amount that the controller controls while the booster is controlled such that the motor generates a driving force more than or equal to the required driving force or that the motor generates a braking force more than or equal to the required braking force.

7. The drive device according to claim 1, wherein while the voltage point is outside the referenced closed region, the controller controls the booster to perform in the second mode such that power is exchanged between the first energy storage and the second energy storage.

8. The drive device according to claim 1, wherein the referenced closed region is a region that satisfies conditions comprising:
a first condition in which the second voltage does not exceed a withstand voltage limit of the motor;
a second condition in which the second voltage is lower than or equal to a maximum boosted value to which the booster boosts the first voltage by a maximum boosting ratio; and
a third condition in which the second voltage is higher than or equal to a minimum boosted value to which the booster boosts the first voltage by a minimum boosting ratio.

9. The drive device according to claim 8, wherein the maximum boosting ratio is a maximum value at which a capability to establish control over the booster is ensured.

10. The drive device according to claim 8, further comprising:
a first sensor to detect the first voltage; and
a second sensor to detect a value to which the first voltage is boosted by the booster,
wherein the minimum boosting ratio is a value based on a product tolerance of the booster and detection errors of the first sensor and the second sensor.

11. The drive device according to claim 8, the conditions further comprising:
a first additional condition in which the second voltage is lower than or equal to a value obtained by subtracting a first margin from the withstand voltage limit of the motor;
a second additional condition in which the second voltage is lower than or equal to a value obtained by subtracting a second margin from the maximum boosted value; and
a third additional condition in which the second voltage is higher than or equal to a value obtained by adding a third margin to the minimum boosted value.

12. The drive device according to claim 11, wherein the first margin, the second margin, and the third margin differ in size.

13. The drive device according to claim 12, wherein the first margin is the smallest of the first, second, and third margins, and the third margin is the largest of the first, second, and third margins.

14. A transport apparatus comprising the drive device according to claim 1.

15. An energy storage control method for a drive device, comprising:
- detecting a first voltage output from a first energy storage;
- detecting a second voltage output from a second energy storage which is superior to the first energy storage in energy to weight density and inferior to the first energy storage in power to weight density, at least one of the first voltage and the second voltage being output to a motor;
- determining whether a voltage point is within a referenced closed region in a two-dimensional coordinate system having a first axis representing the first voltage and having a second axis representing the second voltage, the first axis being perpendicular to the second axis, the voltage point representing a relationship between the first voltage and the second voltage in the two-dimensional coordinate system;
- boosting the first voltage in a first mode in a case where the voltage point is determined to be within the referenced closed region; and
- boosting the first voltage in a second mode in a case where the voltage point is determined to be outside the referenced closed region.

* * * * *